United States Patent [19]
Hunt

[11] Patent Number: 5,772,003
[45] Date of Patent: Jun. 30, 1998

[54] AUTOMATIC LUBRICATION INJECTION SANITIZATION SYSTEM

[75] Inventor: William C. Hunt, Norman, Okla.

[73] Assignee: Bio-Cide International, Inc., Norman, Okla.

[21] Appl. No.: 561,933

[22] Filed: Nov. 22, 1995

[51] Int. Cl.$^6$ .................................................. B65G 45/22
[52] U.S. Cl. ........................ 198/495; 198/500; 184/15.3
[58] Field of Search .................................. 198/495, 500; 184/12, 15.1–15.3

[56] References Cited

U.S. PATENT DOCUMENTS

| | | | |
|---|---|---|---|
| 4,262,776 | 4/1981 | Wilson et al. | 198/500 |
| 4,627,457 | 12/1986 | Bird et al. | 198/500 |
| 4,839,067 | 6/1989 | Jansen | 198/500 |
| 5,320,132 | 6/1994 | Weisse | 198/500 |

*Primary Examiner*—Joseph E. Valenza
*Attorney, Agent, or Firm*—Bill D. McCarthy; Phillip L. Free, Jr.; Randall K. McCarthy

[57] ABSTRACT

An automatic lubrication injection sanitization system for sanitizing and lubricating a conveyor chain system is disclosed. The apparatus includes an inlet water line for supplying a flow of water, an inlet sanitizer line for supplying a flow of sanitizer, and an inlet lubricant line for supplying a flow of lubricant. A pump is operatively connected to the inlet sanitizer line and the inlet lubricant line for pumping a proportionate flow of lubricant and sanitizer into the flow of water, forming an outlet mixture flow. An outlet line receives and distributes the outlet mixture flow which is applied to the conveyor chain to sanitize and lubricate the conveyor chain. Preferably, the apparatus also includes two timers which each control a solenoid. One of the timers controls a solenoid in the outlet line, allowing the outlet mixture flow to be selectively cycled ON and OFF. The other timer controls a solenoid in the inlet sanitizer line and allows the inlet flow of sanitizer to be cycled ON and OFF. The method includes the steps of providing an inlet flow of water; injecting a flow of lubricant and a flow of sanitizer into the flow of water; wherein the flow of water, the injected lubricant and the injected sanitizer form an outlet mixture; distributing the outlet mixture; and applying the outlet mixture to the conveyor chain to lubricate and sanitize the conveyor chain.

3 Claims, 2 Drawing Sheets

AUTOMATIC LUBRICATION INJECTION SANITIZATION SYSTEM

BACKGROUND OF THE INVENTION

1. Field of the Invention

The present invention relates to sanitization of conveyor chains, and more particularly, but not by way of limitation, to an automatic lubrication injection process and apparatus for sanitizing conveyor chains.

2. Discussion

Many industrial plants utilize conveyor chains to transport various items throughout the plant. These conveyor chains serve essentially as an artery system for the plant. In many plants, such as bottling, milk and condiment plants, it is necessary to lubricate the conveyor chains so that they will slide freely underneath the items riding upon them. For instance, in bottling plants, processing rates vary between assorted locations throughout the plant, often causing a backlog of bottles on the conveyor chains at particular sites along the conveyor chain system. Lubrication, commonly referred to as "chainlube," is necessary to allow the conveyor chain to slide freely underneath the backlog of bottles, without tipping them over, until the backlog clears. The chainlube is comprised of an aqueous soap or detergent solution which is diluted and sprayed onto the conveyor chains typically through nozzles.

In food processing plants, product is almost inevitably spilled upon the conveyor chain system. Spilled product along with long chain fatty acids present in the chainlube serve as a food source for bacteria. Bacterial growth is readily spread by the conveyor chain system throughout the plant, forming a biofilm on the conveyor chains. The conveyor chains are typically very difficult to clean. Cleaning is not easily accomplished using conventional cleaning methods because there are many parts of the conveyor chain system which are not accessible, such as overlapping metal parts, screw holes and the pins inserted between the links in the conveyor chain. Within minutes after a conveyor chain is cleaned and the surface is sanitized, bacteria from uncleanable parts of the conveyor chain grows and spreads throughout the entire conveyor chain system. Thus, the conveyor chain system has long been recognized as a prime contaminating vector in most plants.

In food processing plants in particular, bacterial growth can create severe health hazards. For example, many plants have been cited or even closed for being contaminated with bacteria such as *Listeria monocytogenes,* often referred to as "Listeria." In most instances in which a plant has been cited or closed for Listeria contamination, Listeria is found on the conveyor chain surfaces. The closure of plants for Listeria on the conveyor chains and other places has caused untold millions of dollars of loss in product, company reputation, and wages for workers, not to mention the extreme peril to life caused by the continual contamination of the food plants by spoilage and by pathogenic bacteria that grow on the conveyor chains even after cleaning and sanitizing.

Although it has been recognized for years that there was a problem with conveyor chains, there have not yet been any satisfactory solutions. Numerous "sanitizer chainlubes," which combine a sanitizer and a chainlube into a single solution, have been marketed as answers to the conveyor chain problems. However, these "sanitizer chainlubes" are expensive and have suffered several problems.

First, prior art sanitizer chainlubes have been found to be lower in lubricity than regular chainlubes. This is considered to be a primary drawback of sanitizer chainlubes because a poorly lubricated conveyor chain can tangle in equipment and pull the equipment through walls and work areas, endangering workers and expensive equipment. Moreover, increases in production speed have put even greater demands on conveyor chain systems, emphasizing the need for high lubricity.

Second, most "sanitizer" chainlubes are not effective against the years of biofilm that coat the surfaces of conveyor chains and their track and support systems. This biofilm forms an active matrix to support regrowth of the bacteria and recontamination of the conveyor chain system. Without removal of the biofilm, the conveyor chain is not effectively sanitized.

Third, in addition to the problems mentioned above, each of the sanitizer chainlubes seem to have one or more of its own characteristic problems. Sanitizer chainlubes that use phenols are restricted by the E.P.A. Amine chainlubes cause blackening of the chains after several months of use. Chlorine and chlorine dioxide gas cause coagulation of the chainlube and clogging of spray nozzles. Bacteria quickly become resistant to quaternary ammonia chainlubes.

Thus, there is a need for an apparatus and method for sanitizing conveyor chains which overcome the problems associated with the prior art.

SUMMARY OF THE INVENTION

The present invention provides an apparatus and method for sanitizing and lubricating a conveyor chain system. The apparatus of the present invention includes an inlet water line for supplying a flow of water; an inlet sanitizer line for supplying a flow of sanitizer; an inlet lubricant line for supplying a flow of lubricant; a pump means, operatively connected to the inlet sanitizer line and the inlet lubricant line, for pumping a proportionate flow of lubricant and sanitizer into the flow of water to form an outlet mixture flow; and an outlet line for receiving and distributing the outlet mixture flow. The outlet mixture flow is applied to the conveyor chain to sanitize and lubricate the conveyor chain.

In the preferred embodiment the apparatus further includes a sanitizer timer for timing periods when the flow of sanitizer is to be inhibited; a sanitizer solenoid, connected to the inlet sanitizer line and controlled by the sanitizer timer, for selectively inhibiting the flow of sanitizer; a primary timer for timing periods when the outlet mixture flow is to be inhibited; and a primary solenoid, controlled by the primary timer, for selectively inhibiting the outlet mixture flow. Preferably, the primary timer controls the sanitizer timer so that timing is suspended in the sanitizer timer during periods when the outlet mixture flow is to be inhibited.

The method of the present invention includes the steps of: providing an inlet flow of water; in a desired sequence, performing the steps of injecting a flow of a lubricant into the flow of water and injecting a flow of a sanitizer into the flow of water; wherein the flow of water, the injected lubricant and the injected sanitizer form an outlet mixture; distributing the outlet mixture; and applying the outlet mixture to the conveyor chain to lubricate and sanitize the conveyor chain.

An object of the present invention is to reduce the cost of sanitizing conveyor chain systems over prior art sanitizer chainlube systems.

Another object of the present invention is to provide an apparatus and method for sanitizing a conveyor chain system which is effective against the biofilm that coats the surfaces of conveyor chains and their track and support systems.

Yet another object of the present invention is to sanitize conveyor chain systems without decreasing the lubricity of the system.

Still another object of the present invention is to sanitize areas of conveyor chain systems that are not accessible, such as overlapping metal parts, screw holes and the pins inserted between the links in the conveyor chain.

Other objects, advantages and features of the present invention will become apparent from a reading of the following description taken in conjunction with the accompanying drawing and appended claims.

DESCRIPTION

Figure 1:
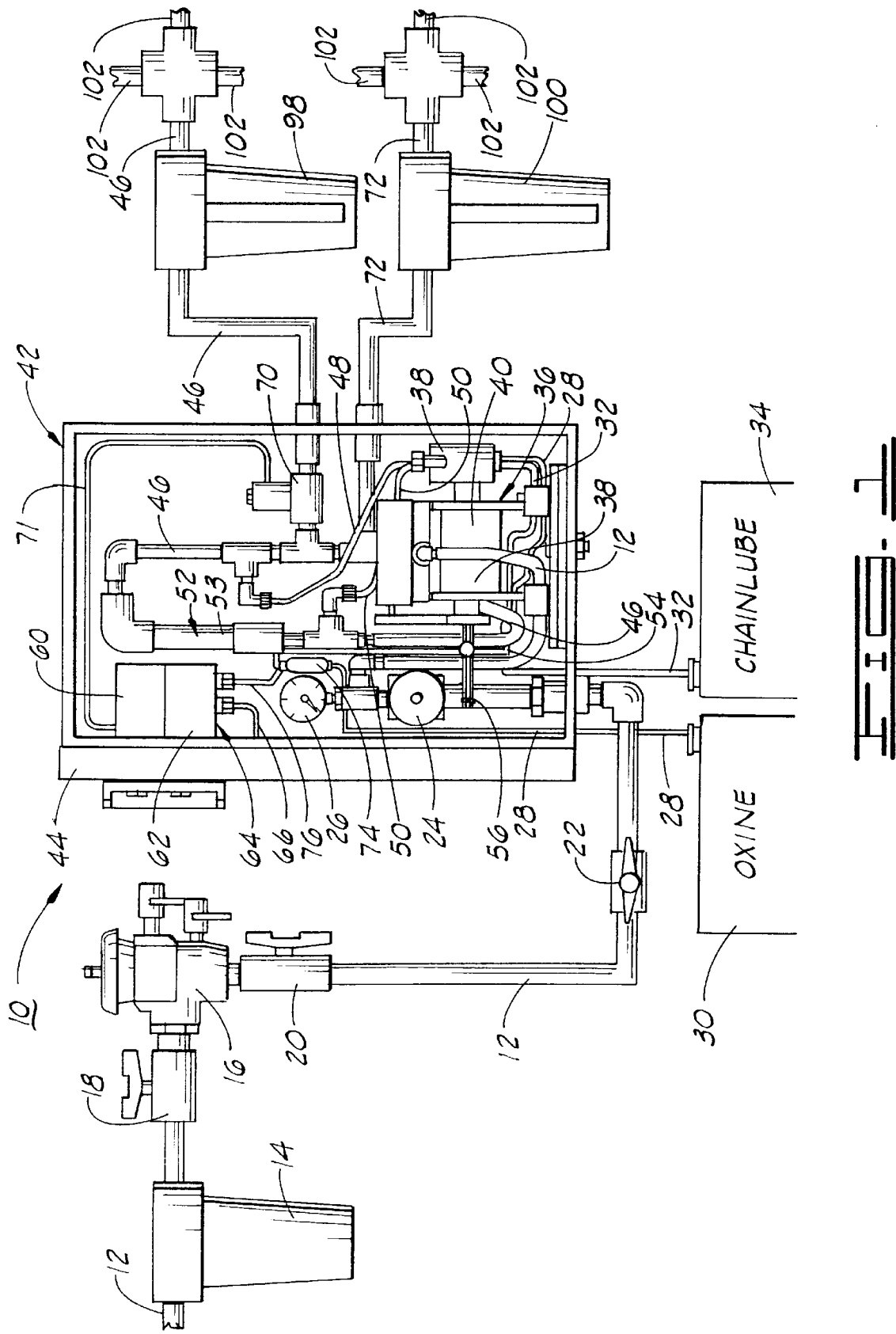
FIG. 1 is a front elevational view of a preferred embodiment of the apparatus of the present invention with the front cover of the mounting box shown in the open position.

Referring now to the drawings, FIG. 1 shows a preferred embodiment of the automatic lube injection sanitization system of the present invention, indicated generally by the numeral 10. The automatic lubrication injection sanitization system, or "ALISS," 10 of the present invention is designed to sanitize and lubricate a conveyor chain system.

In the preferred embodiment, the ALISS 10 includes an inlet water line 12 which is connected to a water filter 14 to purify the inlet flow of water, and to a back flow preventer 16 to eliminate the possibility that chemical back flow from the ALISS 10 could contaminate the water supply. Valves 18, 20 and 22 are provided so that the flow of water can be selectively turned on or off. A pressure regulator 24 and gauge 26 are also provided in the inlet water line 12 to prevent surges which would cause the water pressure to exceed a desired threshold pressure, and to control the outlet pressure of the ALISS 10.

An inlet sanitizer line 28 supplies sanitizer to the ALISS 10. The inlet sanitizer line 28 is connected to a drum or barrel 30 which provides a replenishable supply of sanitizer. The preferred sanitizer for the system is a two percent (2%) solution of Oxine®, a product of Bio-Cide International, Inc. of Norman, Okla. In clinical trials, Oxine® proved to be an especially effective sanitizer and had no deleterious affect on the lubricity of the system. In fact, Oxine appeared to increase the lubricity of the system, which is a significant advantage. Although the preferred embodiment will be described with Oxine as the sanitizer for the system, it will be recognized that other sanitizers could be used in accordance with the present invention, although FDA and EPA regulations may govern the use of such other sanitizers. Other sanitizers include, without limitation, phenols, quaternary ammonia, carbamates, amines, chlorine, sodium chlorite, chlorine dioxide and stabilized chlorine dioxide.

Lubrication, or "chainlube," is provided to the ALISS 10 by an inlet lubricant line 32, which is connected to a drum, or barrel, 34 which provides a replenishable supply of lubricant. Any suitable commercially available chainlube may be used as a lubricant for the ALISS 10. A pump means 36, connected to the inlet water line 12, is provided for pumping a proportionate flow of lubricant and sanitizer through the inlet sanitizer line 28 and the inlet lubricant line 32, respectively, into the flow of water provided by the inlet water line 12. In the presently preferred embodiment, the pump means 36 is a water-driven, dual-head proportioning pump 38 which allows for independently adjustable, metered pumping rates of sanitizer and lubricant. Such a proportioning pump is offered by the Crown Technology Corp. of Lake Forest, Ill., under the model name "Hydroblend."

The proportioning pump 38 includes a water motor cylinder 40. The inlet flow of water drives a reciprocating piston (not shown) in the water motor cylinder 40 which in turn drives a pair of chemical concentrate metering pistons (not shown). One of the two chemical concentrate metering pistons (not shown) draws sanitizer from the drum 30 through the inlet sanitizer line 28, and the other draws lubricant from the drum 34 through the inlet lubricant line 32. A preferred proportion of Oxine® and lubricant has been obtained by sizing the pistons such that the piston drawing the sanitizer has a variable capacity of up to about 0.5 oz./gal. water and the piston drawing the lubricant has a variable capacity of up to about 2–3 oz./gal. water. Larger sizes may be used for the pistons where more sanitizer or lubricant are needed. The proportioning pump 38 should be mounted 42 inches above the floor so that a drum 34 of lubricant and a drum 30 of sanitizer can be placed beneath the proportioning pump 38. Preferably, the proportioning pump 38 and many of the other components of the ALISS 10 are installed in a mounting box 42 which includes a hinged front cover 44 (shown in FIG. 1 in the open position), and is attached to a wall (not shown).

The flow of water exits on the back side (not shown) of the proportioning pump 38 through an outlet line 46 connected to the proportioning pump 38. An outlet sanitizer line 48 and an outlet lubricant line 50 provide passage for the sanitizer and lubricant, respectively, drawn by the proportioning pump 38. The outlet lubricant line 50 is coupled to the outlet line 46, allowing the lubricant to mix into the flow of water provided in the outlet line 46. A static mixer 52, such as the Stata-tube Mixer, catalog number FMX 7109-P offered by Omega Engineering Inc. of Stamford, Conn., is provided in the outlet line 46 to ensure thorough mixing of the water and lubricant. The static mixer 52 is held within a special one inch sch-80 threaded pipe 53 available from Ryan Herco, Dallas/Ft. Worth Service Center, of Grand Prairie, Tex. The outlet sanitizer line 48 is coupled to the outlet line 46 so that the flow of sanitizer is mixed into the flow of water and lubricant in the outlet line 46, forming a resultant outlet mixture flow in the outlet line 46.

A sample of the outlet mixture flow can be taken and a concentration test can be performed (e.g., titration) to determine the ratios of sanitizer and lubricant to water in the outlet mixture. An adjustment locking knob 54 and a concentration adjustment knob 56 are provided for each of the two chemical concentrate metering pistons (not shown). The operator can independently adjust the ratio of lubricant or sanitizer to water in the outlet mixture flow by loosening the adjustment locking knob 54 and turning the concentration adjustment knob 56 to the desired setting. When the desired ratio is reached, the operator may then tighten the adjustment locking knob 54. Suitable results have been obtained with an Oxine® concentration of from about 10 ppm to about 30 ppm available chlorine dioxide in the outlet mixture flow. The lubricant should be diluted according to the directions provided by the manufacturer.

In the preferred embodiment, the ALISS 10 also includes a primary timer 60 and a slave timer 62 (sometimes referred to herein as a sanitizer timer). The timers 60, 62 reside in a common housing 64 installed within the mounting box 42. Power is supplied to the timers 60, 62 from a standard power cord 66, which is plugged into a 110 volt AC outlet (not shown). The primary timer 60 controls a primary solenoid 70 mounted in the outlet line 46 via a line 71. The primary solenoid 70 is a common piloted or direct acting solenoid capable of operating 24 hours per day. Desirably, the primary solenoid 70 is a stainless or electroless nickel-plated, piloted solenoid, although other suitable solenoids will be apparent to those skilled in the art. The primary timer 60 is an adjustable, percent timer that cycles ON for an adjustable, set period of time and cycles OFF for an adjustable, set period of time. By controlling the primary solenoid 70, the primary timer 60 controls the outlet mixture flow for the ALISS 10 through the outlet line 46. This allows the operator to cycle the outlet mixture flow OFF for a period of time to allow for economic use of lubricant and sanitizer as well as foam control. A bypass line 72 is coupled to the outlet line 46 before the primary solenoid 70 to provide a constant ON line for special use areas of the conveyor chain.

The slave timer 62 is controlled by the primary timer 60 and all timing cycles for timer 62 are suspended during periods when the primary timer 60 cycles the primary solenoid 70 OFF. When the primary solenoid 70 is cycled OFF, the flow of solution to the system is stopped. When the primary timer 60 cycles the primary solenoid 70 ON, the slave timer 62 begins its adjustable timing cycles, controlling a sanitizer solenoid 74 in the inlet sanitizer line 28 via a line 76. As above with the primary solenoid 70, the sanitizer solenoid 74 is a common isolation solenoid capable of operating 24 hours per day. Desirably, the sanitizer solenoid 74 is a plastic, direct acting isolation solenoid which opens under vacuum and is capable of working long term, although other suitable solenoids will be apparent to those skilled in the art. Thus, the slave timer 62 allows the operator to set adjustable cycles for application of the sanitizer solution to the conveyor chain, allowing the system to cycle OFF the sanitizer while continuing to lubricate the conveyor chain.

Figure 2:
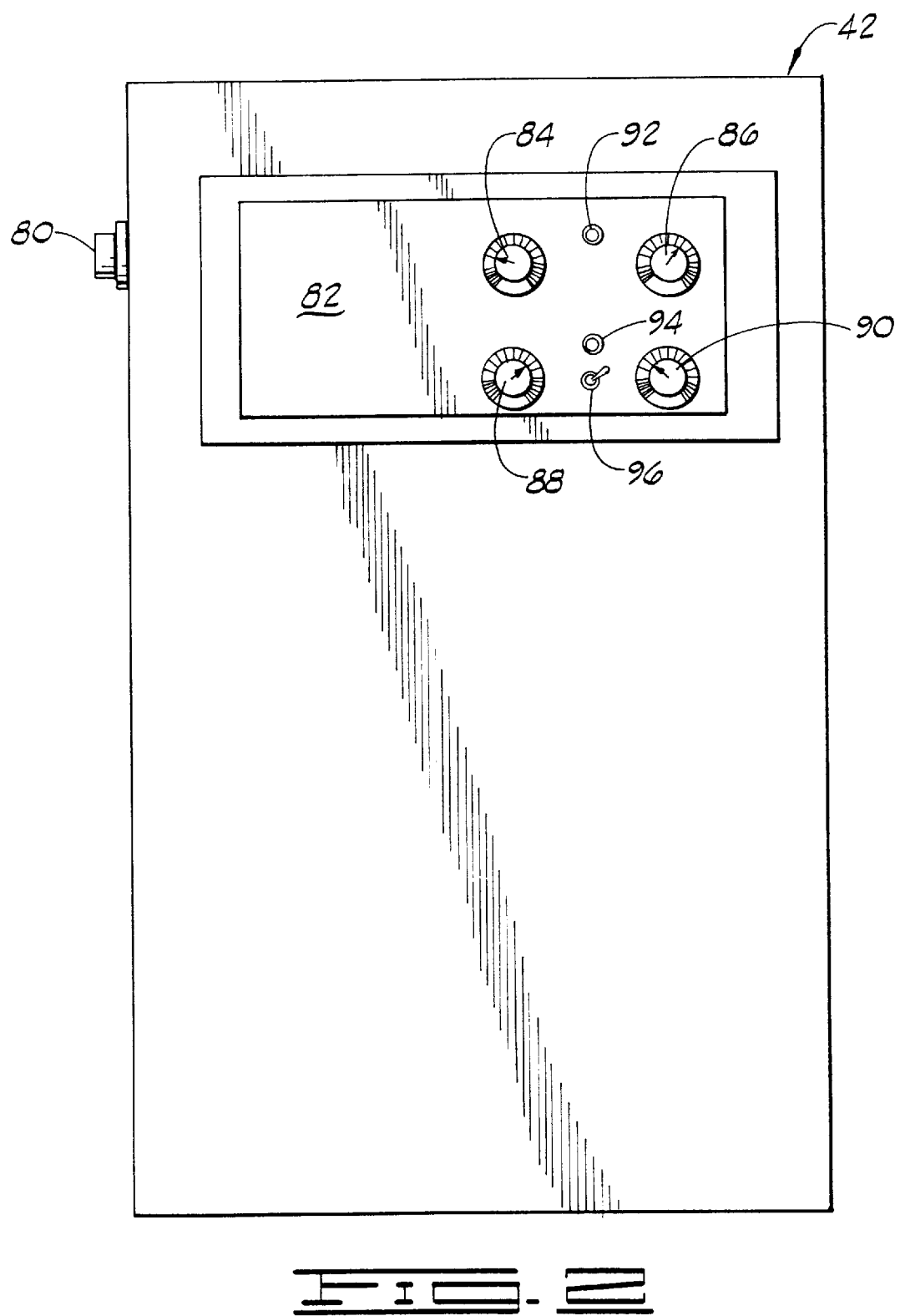
FIG. 2 is a front elevational view of the front cover of the mounting box.

Turning now to FIG. 2, a master switch 80 on the side of the mounting box 42 controls the power for the ALISS 10. The master switch 80 is a two position switch having an ON and an OFF position. When the master switch 80 is in the OFF position, all timing cycles are suspended and the primary solenoid 70 halts all flow through the ALISS 10. When the master switch 80 is in the ON position, timing cycles are allowed to proceed and the primary solenoid 70 is controlled by the primary timer 60.

In the preferred embodiment the timers are ON/OFF recycling timers available from SSAC Inc. of Baldwinsville, N.Y., and each timer allows independent adjustment of both the ON and OFF cycles. The primary timer 60 is preferably Catalog Number DSDR 254A2 and is adjustable between ON cycles of 1–100 minutes and OFF cycles of 2–17 minutes. The slave timer 62 is preferably Catalog Number DSDR 254A5 and is adjustable between ON cycles of 1–100 minutes and OFF cycles of 10–1000 minutes.

As shown in FIG. 2, the front cover 44 of the mounting box 42 includes a timer control panel 82 having four knobs, 84, 86, 88, and 90. Each of the four knobs 84, 86, 88 and 90 controls a potentiometer which is mounted to the back of the timer control panel 82. The four potentiometers (not shown) are used to adjust the timing cycles for the primary timer 60 and the slave timer 62. The knobs 84, 86, 88 and 90 control a lubricant ON cycle potentiometer, a lubricant OFF cycle potentiometer, a sanitizer ON cycle potentiometer, and a sanitizer OFF cycle potentiometer, respectively. Each of the potentiometers is a five megohm resistance potentiometer, available from SSAC Inc. of Baldwinsville, N.Y., catalog number P1004-13. The timers are connected through a four pole double throw multi-contact AC relay (not shown) (available from Potter Brumfield, Inc., 200 S. Richard Creek Drive, Prinston, Ind., Catalog Number R10-E1-W4-V700 4 pole 24 volt) in such a way that when the primary timer 60 goes into the OFF condition, one lead each from the sanitizer ON cycle potentiometer and the sanitizer OFF cycle potentiometer is electrically opened, suspending timing in the slave timer 62. Connecting the timers in this way allows for proper addition of sanitizer only during the ON cycle of the lube system. In other words the sanitizer timer will not cycle ON during times that the ALISS 10 is not delivering lube to distribution.

Preferably, the timer control panel 82 also includes a lubricant indicator light 92, a sanitizer indicator light 94 and a sanitizer toggle switch 96. The lubricant indicator light 92 and the sanitizer indicator light 94 are lighted when the primary timer 60 and the secondary timer 62, respectively, are in an ON cycle. This allows the operator to perceive the state of the ALISS 10 by viewing the timer control panel 82. The sanitizer toggle switch 96 allows the operator to manually turn the slave timer 62 OFF during periods when it is desired to operate the ALISS 10 without the addition of sanitizer.

By adjusting the timing cycles for the primary timer 60 and slave timer 62, the operator can on site manufacture a sanitizer/chainlube with two separate products that may be unstable or perhaps more expensive as a single precursor product supplied in a single drum. The adjustability of the timing cycles for the sanitizer and lubricant allows significant cost reductions to be realized over the prior techniques. For instance, the sanitizer can be adjusted from a constant application cycle to a cycle allowing one "injection" per day. The adjustability of the timing cycles also allows better foam control as well as lower sanitizer and lubricant discharge into the sewer system.

As shown in FIG. 1, the resultant outlet mixture flow exits through outlet line 46 and bypass line 72. Sight-mix vessels 98, 100 are optionally provided in each of these lines to ensure proper mixing. The outlet line 46 and bypass line 72 supply the outlet mixture flow to multiple distribution lines 102 which apply the outlet mixture flow to the conveyor chain system through application nozzles (not shown).

Although the embodiment described above utilizes a water-driven, dual head proportioning pump 38 as the pump means 36 for the ALISS 10, persons skilled in the art will recognize other suitable pump means 36 for pumping a proportionate flow of lubricant and sanitizer into the flow of water to form an outlet mixture flow, and all of such pump means 36 are encompassed within the spirit and scope of the present invention. For instance, without limitation, a water flow meter could be used to generate a signal to two separate pump systems. One of the pump systems could be pulsed to supply a metered flow of lubricant and the other to supply a metered flow of sanitizer.

It will be clear that the present invention is well adapted to carry out the objects and attain the advantages mentioned as well as those inherent therein. While presently preferred embodiments of the invention have been described for purposes of this disclosure, numerous changes can be made which will readily suggest themselves to those skilled in the art and which are encompassed within the spirit of the invention disclosed and as defined in the appended claims.

What is claimed is:

1. An apparatus for sanitizing and lubricating a conveyor chain system, comprising:

an inlet water line for supplying a flow of water;

an inlet sanitizer line for supplying a flow of sanitizer;

an inlet lubricant line for supplying a flow of lubricant;

a pump means, operatively connected to the inlet sanitizer line and the inlet lubricant line, for pumping a proportionate flow of lubricant and sanitizer into the flow of water to form an outlet mixture flow having proper proportions of water, sanitizer and lubricant;

an outlet line for receiving and distributing the outlet mixture flow;

means, operatively connected to the outlet line, for cycling the outlet mixture flow on for a period of time and off for a period of time, comprising:
  a first timing means for timing periods when the outlet mixture flow is to be cycled off; and
  means, operatively connected to the outlet line and to the first timing means, for selectively inhibiting the outlet mixture flow during periods when the outlet mixture flow is to be cycled off; and means, operatively connected to the inlet sanitizer line, for cycling the inlet flow of sanitizer on for a period of time and off for a period of time, comprising;
  a second timing means for timing periods when the inlet flow of sanitizer is to be cycled off; and
  means, operatively connected to the inlet sanitizer line and to the timing means, for interrupting the flow of sanitizer during period when the inlet flow of sanitizer is to be cycled off.

wherein the first timing means controls the second timing means so that timing is suspended in the second timing means during periods when the outlet mixture flow is to be cycled off.

2. An apparatus for sanitizing and lubricating a conveyor chain system, comprising:

an inlet water line for supplying a flow of water;

an inlet sanitizer line for supplying a flow of sanitizer;

an inlet lubricant line for supplying a flow of lubricant;

a pump means, operatively connected to the inlet sanitizer line and the inlet lubricant line, for pumping a proportionate flow of lubricant and sanitizer into the flow of water to form an outlet mixture flow having proper proportions of water, sanitizer and lubricant;

an outlet line for receiving and distributing the outlet mixture flow;

means, operatively connected to the inlet water line, for cycling the outlet mixture flow on for a period of time and off for a period of time, comprising;
  a first timing means for timing periods when the outlet mixture flow is to be cycled off; and
  means, operatively connected to the inlet water line and to the first timing means, for selectively inhibiting the outlet mixture flow during periods when the outlet mixture flow is to be cycled off;

means, operatively connected to the inlet sanitizer line, for cycling the inlet flow of sanitizer on for a period of time and off for a period of time, comprising;
  a second timing means for timing periods when the inlet flow of sanitizer is to be cycled off; and
  means, operatively connected to the inlet sanitizer line and to the timing means, for interrupting the flow of sanitizer during periods when the inlet flow of sanitizer is to be cycled off; and wherein the first timing means controls the second timing means so that timing is suspended in the second timing means during periods when the outlet mixture flow is to be cycled off.

3. An apparatus for sanitizing and lubricating a conveyor chain system, comprising:

an inlet water line for supplying a flow of water;

an inlet sanitizer line for supplying a flow of sanitizer;

an inlet lubricant line for supplying a flow of lubricant;

a pump means, operatively connected to the inlet sanitizer line and the inlet lubricant line, for pumping a proportionate flow of lubricant and sanitizer into the flow of water to form an outlet mixture flow having proper proportions of water, sanitizer and lubricant, an outlet line for receiving and distributing the outlet mixture flow;

a sanitizer timer for timing periods when the flow of sanitizer is to be inhibited;

a sanitizer solenoid, connected to the inlet sanitizer line and controlled by the sanitizer timer, for selectively inhibiting the flow of sanitizer;

a primary timer for timing periods when the outlet mixture flow is to be inhibited; and a primary solenoid, controlled by the primary timer, for selectively inhibiting the outlet mixture flow;

wherein the primary timer controls the sanitizer timer so that timing is suspended in the sanitizer timer during period when the outlet mixture flow is to be inhibited.

* * * * *